(12) United States Patent
Green (10) Patent No.: US 11,668,430 B2
(45) Date of Patent: Jun. 6, 2023

(54) ENGINE MOUNT STAND

(71) Applicant: Robert Green, Hanahan, SC (US)

(72) Inventor: Robert Green, Hanahan, SC (US)

( * ) Notice: Subject to any disclaimer, the term of this patent is extended or adjusted under 35 U.S.C. 154(b) by 39 days.

(21) Appl. No.: 17/039,332

(22) Filed: Sep. 30, 2020

(65) Prior Publication Data

US 2022/0099239 A1    Mar. 31, 2022

(51) Int. Cl.
*F16M 5/00* (2006.01)
*F16M 7/00* (2006.01)

(52) U.S. Cl.
CPC .............. *F16M 5/00* (2013.01); *F16M 7/00* (2013.01)

(58) Field of Classification Search
CPC ............. F16M 5/00; F16M 7/00; F01D 25/28
See application file for complete search history.

(56) References Cited

U.S. PATENT DOCUMENTS

| | | | |
|---|---|---|---|
| 1,464,065 A | 8/1923 | Dickover et al. | |
| 2,885,165 A * | 5/1959 | Smolen | F16M 5/00 |
| | | | 269/296 |
| 3,719,356 A * | 3/1973 | Winstead | B25H 1/0007 |
| | | | 269/48 |
| 4,239,196 A | 12/1980 | Hanger | |
| 4,511,112 A | 4/1985 | Ruehle | |
| 4,804,162 A * | 2/1989 | Rice | F16M 11/046 |
| | | | 248/129 |
| 5,502,342 A * | 3/1996 | Feldkamp | F16M 5/00 |
| | | | 310/51 |
| 5,542,642 A * | 8/1996 | Rivard | F16M 5/00 |
| | | | 248/676 |
| 6,003,830 A | 12/1999 | Egan | |
| 6,098,974 A * | 8/2000 | Dolgas | H02K 15/165 |
| | | | 269/296 |
| 6,793,458 B2 * | 9/2004 | Kawai | F01D 25/28 |
| | | | 415/213.1 |
| 6,866,246 B2 * | 3/2005 | Collier | B66F 3/36 |
| | | | 254/2 B |
| 8,876,448 B1 * | 11/2014 | Hess | F01D 25/28 |
| | | | 410/46 |
| 9,421,655 B2 * | 8/2016 | Hacker | B23Q 3/103 |
| 10,279,457 B2 * | 5/2019 | Lee | B23Q 1/01 |
| 10,935,000 B2 * | 3/2021 | Augusto Lizarraga | F03D 13/40 |
| 11,518,458 B2 * | 12/2022 | Kribernegg | B25H 1/0007 |
| 2004/0227134 A1 * | 11/2004 | Collier | B25H 1/0007 |
| | | | 254/133 R |

(Continued)

*Primary Examiner* — Eret C McNichols
(74) *Attorney, Agent, or Firm* — Alston & Bird LLP (57) ABSTRACT

In various embodiments, an engine mount may comprise a mount base configured to physically engage at least a portion of an engine positioned adjacent thereto so as to secure the engine in a mounted position relative to the engine mount, the mount base comprising: a base component; an engine positioning element protruding from the base component and configured to restrict a range of motion of the engine in at least one direction; and at least one base orifice extending through a thickness of the base component and configured to receive a protruding portion of the engine within an internal volume of the base orifice; and an attachment hub comprising one or more attachment features configured to receive at least a portion of an external engine tool and engage the external engine tool such that at least a portion of the external engine tool is arranged adjacent the mount base.

20 Claims, 7 Drawing Sheets

(56) References Cited

U.S. PATENT DOCUMENTS

| | | | |
|---|---|---|---|
| 2008/0105638 A1* | 5/2008 | Crawford | B66C 1/62 |
| | | | 212/180 |
| 2014/0042681 A1* | 2/2014 | Kooney | B25B 11/002 |
| | | | 29/559 |
| 2014/0259663 A1* | 9/2014 | Scelsi | B25H 1/10 |
| | | | 29/888.01 |
| 2017/0023171 A1* | 1/2017 | Khan | F16M 3/00 |
| 2017/0136607 A1* | 5/2017 | Lee | B25B 11/02 |
| 2020/0248591 A1* | 8/2020 | Cooper | F01D 25/28 |
| 2021/0024153 A1* | 1/2021 | Kribernegg | B23P 19/04 |
| 2021/0354254 A1* | 11/2021 | Kottre | B23P 19/042 |
| 2022/0099239 A1* | 3/2022 | Green | F16M 7/00 |

\* cited by examiner

ENGINE MOUNT STAND

FIELD OF THE INVENTION

Various embodiments described herein relate generally to engine mount stands. In particular, various embodiments are directed to engine mount stands configured to support an engine thereon for engine display and user interaction.

BACKGROUND

Industrial and commercial applications may use engine mount stands to support and secure an engine in a desired position. In particular, an engine mount stand may be used to support an engine an upright position such that the engine is substantially visible to a proximate bystander and accessible to a user for interaction therewith. Through applied effort, ingenuity, and innovation, Applicant has solved problems relating to engine mount stands by developing solutions embodied in the present disclosure, which are described in detail below.

BRIEF SUMMARY

Various embodiments are directed to an engine mount and method of using the same. In various embodiments, an engine mount may comprise an engine mount comprising: a mount base configured to physically engage at least a portion of an engine positioned adjacent thereto so as to secure the engine in a mounted position relative to the engine mount, the mount base comprising: a base component; one or more engine positioning element protruding from the base component and configured to restrict a range of motion of the engine in at least one direction, wherein the range of motion of the engine in the at least one direction is defined in part by a displacement of the engine measured relative to the mount base in the at least one direction; and at least one base orifice extending through a thickness of the base component, the at least one base orifice being configured to receive a protruding portion of the engine within an internal volume of the at least one base orifice; and an attachment hub comprising one or more attachment features configured to receive at least a portion of an external engine tool and engage the external engine tool such that at least a portion of the external engine tool is arranged at least substantially adjacent the mount base.

In various embodiments, the at least one base orifice may comprise a plurality of orifices extending through an entirety of the thickness of the base component. In certain embodiments, each of the plurality of base orifices may be defined at least in part by an orifice size and an orifice shape, wherein each of the plurality of base orifices is configured based at least in part on the configuration of the respective protruding portion received thereby. In certain embodiments, at least two of the plurality of base orifices may be arranged a distance apart such that a portion of the base component extends therebetween, wherein the portion of the base component between the at least two of the plurality of base orifices defines a support beam, the support beam being configured to physically engage a portion of the engine so as to support the engine disposed in mounted position.

In various embodiments, the attachment hub may further comprise an attachment plate; wherein the one or more attachment features of the attachment hub comprise one or more attachment hub aperture extending through a thickness of the attachment plate and being configured to receive at least a portion of the external engine tool within an internal volume of the one or more attachment hub aperture. In certain embodiments, the one or more attachment hub aperture may comprise a wide-mouth aperture, and wherein the external engine tool received by the wide-mouth aperture comprises one or more of a large external engine tool and a small external engine tool. In certain embodiments, the one or more attachment hub aperture comprises a narrow-mouth aperture, and wherein the external engine tool received by the narrow-mouth aperture comprises a small external engine tool. Further, In certain embodiments, the one or more attachment hub aperture may comprise a plurality of attachment hub apertures. In certain embodiments, the plurality of attachment hub apertures may comprise at least one narrow-mouth aperture and at least one wide-mouth aperture.

In various embodiments, wherein the attachment hub may be fixedly secured to at least a portion of the base mount. In various embodiments, the mount base may comprise one or more base fastening feature, and wherein the attachment hub comprises one or more attachment leg base interface configured to engage at least a portion of the one or more base fastening features so as to facilitate a non-permanent attachment of the attachment hub to the mount base, wherein the attachment hub is configured to be selectably detachable from the mount base. In various embodiments, the one or more engine positioning element may comprise a lateral positioning element configured to restrict a lateral range of motion of the engine in a lateral direction. In certain embodiments, the one or more engine positioning element may further comprise a second lateral positioning element configured to further restrict the lateral range of motion of the engine, the second lateral positioning element being configured to restrict the lateral range of motion of the engine in a second lateral direction, wherein the second lateral direction is in a substantially opposite direction from the lateral direction. In certain embodiments, the lateral positioning element and the second lateral positioning element may be separated by a lateral distance extending therebetween, and wherein the lateral positioning element and the second lateral positioning element are collectively configured to fully restrict the lateral range of motion of the engine such that the lateral range of motion is defined in part by the lateral distance between the lateral positioning element and the second lateral positioning element.

In various embodiments, the one or more engine positioning element may comprise a longitudinal positioning element configured to restrict a longitudinal range of motion of the engine in a longitudinal direction. In various embodiments, the one or more engine positioning element may further comprise a lateral positioning element configured to restrict a lateral range of motion of the engine in a lateral direction, wherein the lateral direction is at least substantially perpendicular to the longitudinal direction. In various embodiments, at least one of the one or more engine positioning elements may comprise a positioning element aperture extending therethrough, the positioning element aperture being configured to secure an extension arm therein, wherein the extension arm disposed within the positioning element aperture extends in a non-parallel direction relative to the at least one of the one or more positioning elements engaged therewith.

BRIEF DESCRIPTION OF THE DRAWINGS

Reference will now be made to the accompanying drawings, which are not necessarily drawn to scale, and wherein.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

Traditional engines used in the automotive and aviation industries, for example, are large, heavy pieces of machinery that can require frequent upkeep and/or maintenance over the course of the engine's lifespan. In operation, however, an engine is typically positioned within an automobile, motorcycle, airplane, and/or the like in an inconvenient position that is relatively inaccessible to a user. As such, engine mounts are used to hold an engine in a desired position external to a corresponding automobile, motorcycle, airplane. Given the size and weight of most traditional engines, traditional engines mounts require a large amount of material so as to ensure that the strength characteristics of the engine mount are sufficient to maintain structural integrity when exposed to the heavy load condition that is experienced when the mount is supporting an engine. Accordingly, traditional engine mount configurations include a multitude of supporting features arranged about the exterior of the engine, which limits the extent to which a user can access various portions of the mounted engine, such as, for example, for maintenance and/or inspection purposes. Similarly, the bulky designs of traditional engine mount stands restrict the extend to which an engine mounted therein may be displayed, as much of the line of sight between the engine and a proximate bystander is obstructed by portions of the engine mount. Further, traditional engine mounts with engines mounted therein can be difficult to maneuver about an environment, as bulky exterior designs can limit mobility and/or decrease the extent to which various traditional engine tools may be utilized to service a mounted engine. Accordingly, a need exists for an engine mount capable of fully supporting the weight of an engine without compromising the structural integrity of the mount, while simultaneously being configured to as to maximize the visibility of a mounted engine therein and facilitating a mobile a maneuverable mode of operability such that the engine mount may be easily transportable to various stationary engine tools displaced within an environment.

Figure 1:
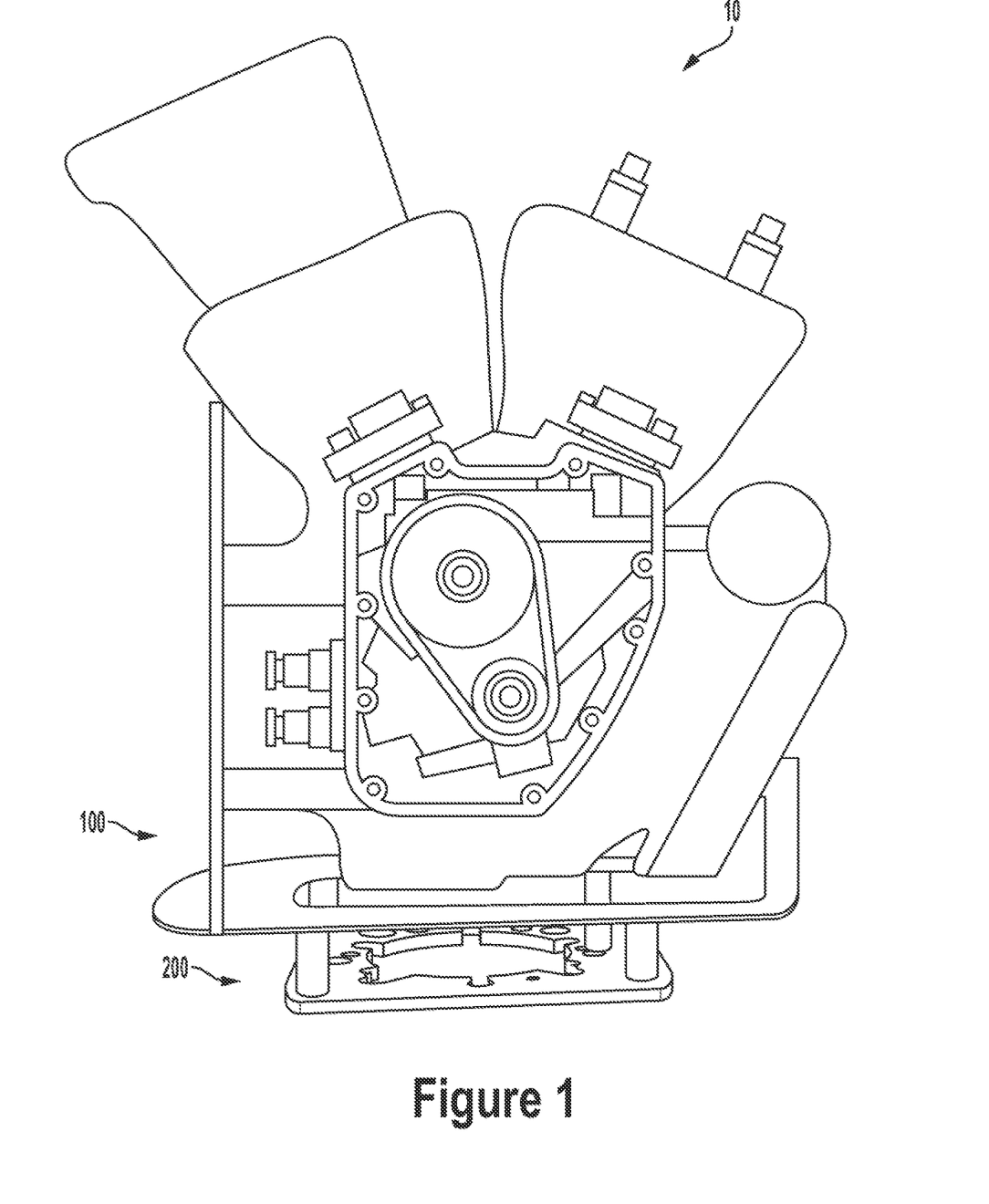
FIG. 1 illustrates a perspective view of an exemplary apparatus according to an embodiment as described herein.

FIG. 1 illustrates a perspective view of an exemplary apparatus according to an embodiment as described herein. In particular, FIG. 1 illustrates an exemplary engine mount according to various embodiments described herein, the exemplary engine mount 10 being configured to receive at least a portion of an engine. As illustrated, in various embodiments, an exemplary engine mount 10 may be configured to physically contact the at least a portion of the received engine so as to at least substantially stabilize the engine in a mounted position. For example, a mounted position may be defined by an arrangement of the engine wherein the engine is physically engaged with the engine mount and at least substantially stabilized relative to the engine mount such that the engine may, for example, be shown on display and/or accessed by a user at one or more locations about the engine for maintenance purposes.

In various embodiments, an engine mount 10 may comprise a mount base 100 and an attachment hub 200. As described herein in further detail herein, a mount base 100 may be configured to receive (e.g., physically contact) at least a portion of an engine at one or more locations about the engine so as to at least substantially stabilize the engine in a mounted position. For example, a mount base 100 may be configured to physically engage at least a portion of an engine (e.g., at least one engine surface), such as, for example, a bottom portion, one or more side portion, a top portion, and/or the like, so prevent the engine engaged therewith from moving relative to the mount base 100 in one or more directions. As illustrated in FIG. 1 and as described in further detail herein, a mount base 100 may be configured to engage a bottom portion and one or more side portions of an engine to facilitate the stabilization of the engine in a mounted position. In various embodiments, the engine mount 10 may comprise an attachment hub 200 secured to the mount base 100. As described herein, an attachment hub 200 may extend from a portion of the mount base 100 and comprise one or more elements configured to receive at least a portion of one or more engine tools so as to tether, holster, and/or organize the one or more engine tools in a position proximate the mount base 100 (e.g., an engine arranged in a mounted position). For example, an attachment hub 200 may be configured to receive an engine tool so as to position the engine tool proximate the mount base 100 in order to facilitate a connection to the engine and/or the accessibility of the one or more tools to a user standing near the engine mount 10.

Figure 2:
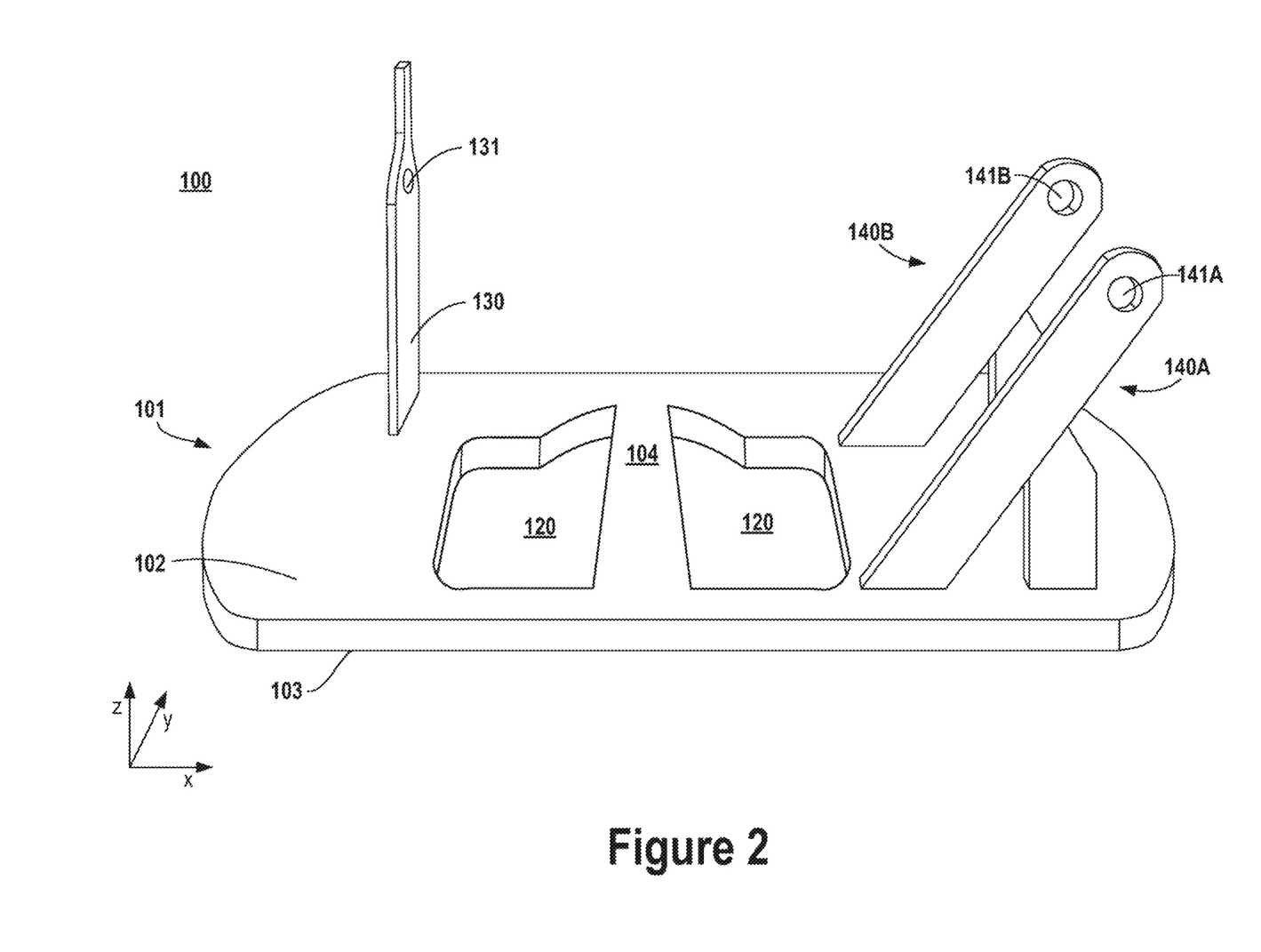
FIG. 2 illustrates a perspective view of an exemplary apparatus according to an embodiment as described herein.
Figure 3A:
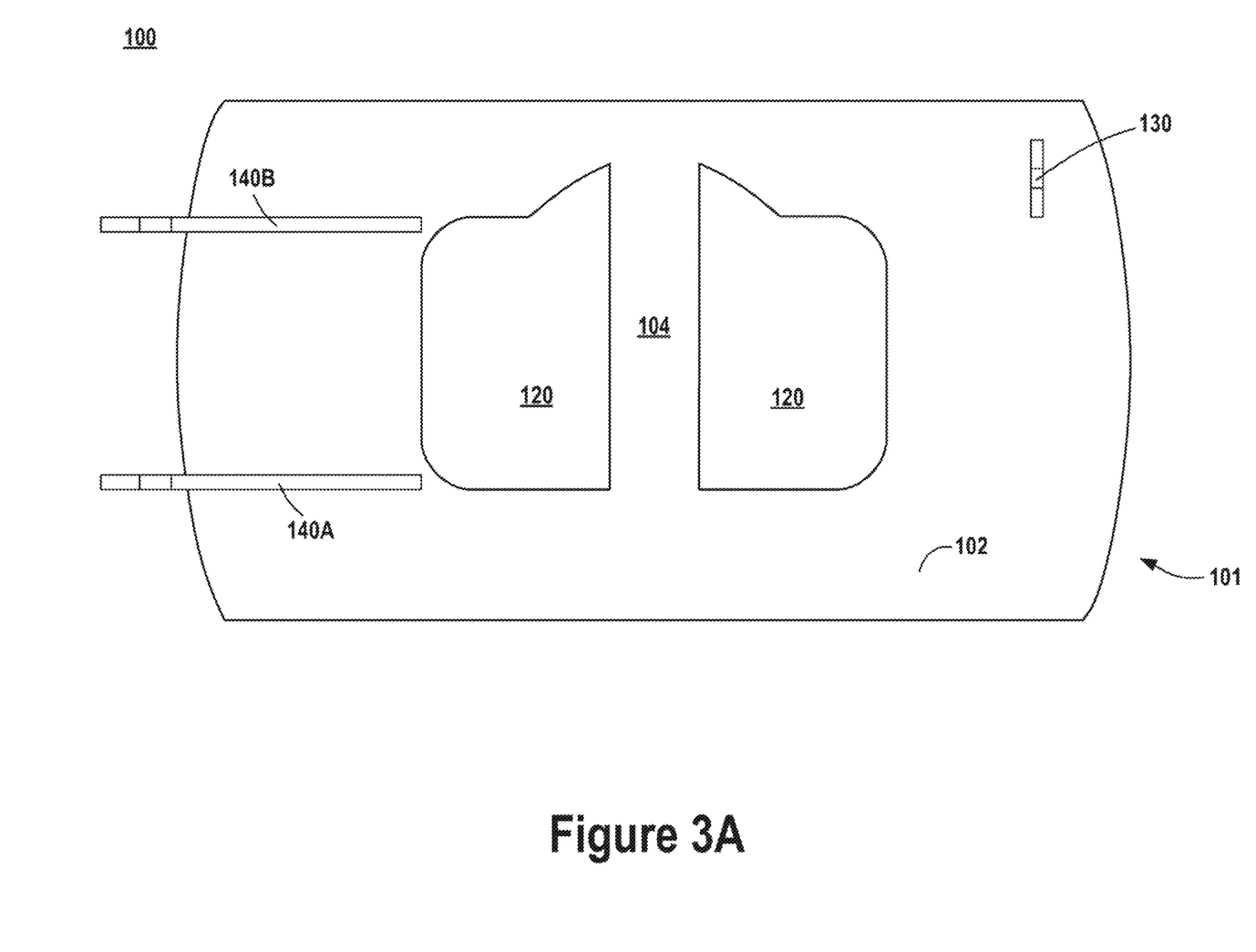
FIGS. 3A and 3B illustrate various views of an exemplary apparatus according to an embodiment described herein.
Figure 3B:
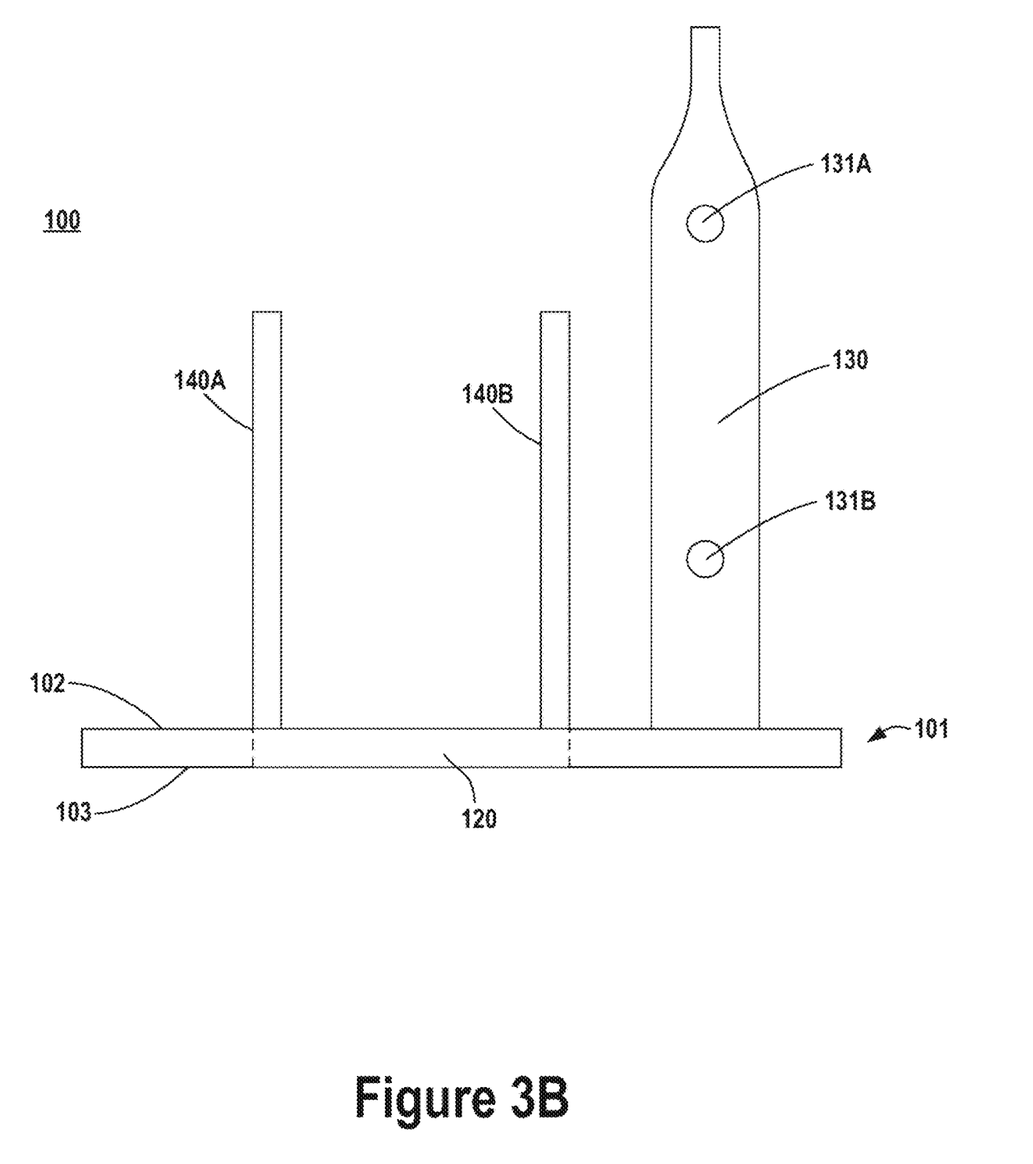

FIGS. 2-3B illustrate various views of an exemplary apparatus according to an embodiment described herein. In particular, FIG. 2 illustrates a perspective view of an exemplary mount base 100 according to an embodiment described herein. Further, FIG. 3A and FIG. 3B illustrate a top view and a side view, respectively, of an exemplary mount base 100 according to various embodiments described herein. In various embodiments, a mount base 100 may comprise a base component 101 configured to engage (e.g., physically support) a bottom portion of an engine arranged in a mounted position within the mount base 100. An exemplary base component 101 may be defined at least in part by a top base surface 102 and a bottom base surface 103, with a base thickness extending therebetween in a vertical direction (e.g., in the z-direction, as illustrated). As illustrated in FIG. 1, the base component 101 may comprise a substantially flat planar configuration wherein both of the top base surface 102 and the bottom base surface 103 are substantially flat along a horizontal plane (e.g., in the x-direction). Alternatively, in various embodiments, one or both of the top base surface 102 and the bottom base surface 103 may comprise a curved configuration and/or a complex configuration so as to correspond to a geometric configuration of an exemplary engine. In various embodiments, an exemplary base component 101 may be made of a substantially rigid material such as, for example, a metal, plastic, wood, rubber, and/or the like. As a non-limiting example, the base component may be made of aluminum so as to provide a lightweight mount configuration that is both mobile (e.g., relatively easy to move) and durable, such as, for example, an aluminum alloy 6061-t6. In various embodiments, the base component 101 may comprise a substantially rectangular profile having a base length and a base width, as illustrated, or, alternatively, a substantially rounded profile having a base diameter. For example, the base component 101 may be defined at least in part by a base surface area that is sufficiently large so as to engage at least a portion of a bottom portion of an exemplary engine, as described herein, and facilitate the positioning of the exemplary engine in a mounted position within the mount base 100. As a non-limiting illustrative example, the base component 101 may comprise a base surface area of at least approximately between 50 in$^2$ and 600 in$^2$ (e.g., between 200 in$^2$ and 300 in$^2$).

In various embodiments, the mount base 100 may further comprise an orifice extending through the thickness of the base component 101 and configured to receive at least a portion of an engine therein when the engine is arranged in a mounted position within the mount base. For example, as illustrated in FIG. 2, an exemplary mount base may comprise a plurality of orifices 120 (e.g., two orifices 120), extending entirely through the thickness of the base component 101 (e.g., through both the top base surface 102 and the bottom face surface 103) and configured such that one or more bottom portions of an exemplary engine may protrude therethrough upon the engine being disposed in a mounted position within the mount base 100. For example, each orifice 120 may be configured such that the shape and the location of the orifice about the base component 101 is based on a configuration of a corresponding concave portion of an exemplary engine to be mounted on the mount base 100. In such an exemplary circumstance, each respective orifice 120 may be configured such that the corresponding concave engine bottom portion may at least partially fit therethrough, thereby allowing a substantially flat planar bottom portion of the engine to engage the similarly flat planar base component 101 (e.g., at a support beam 104) so as to increase the surface area of physical engagement between the mount base 100 and the exemplary engine mounted therein and generate a more secure mounted position.

In various embodiments, the mount base 100 may further comprise a support beam 104 arranged at least substantially adjacent the one or more orifice 120. As described, the support beam 104 may comprise a substantially flat planar element that defines a portion of the base component 101 and is configured to physically engage an exemplary engine at a substantially flat planar bottom portion adjacent a concave protruding bottom engine portion disposed within the one or more orifice 120. For example, the configuration of the support beam 104 (e.g., a support beam width) may be defined at least in part according to the configuration of the one or more orifice 120 (e.g., the two orifices) of the mount base 100. Further, in various embodiments, the support beam 104 may be configured at least in part based on the configuration (e.g., shape and/or size) of a corresponding flat planar bottom portion of the exemplary engine arranged in the mounted position within the mount base 100. In various embodiments, the support beam 104 may be disposed within substantially the same horizontal plane as the base component 101 and may have a support beam thickness that is at least substantially equivalent to the base component thickness. In various embodiments, the support beam 104 may comprise one or more reinforced portions (e.g., at the bottom base surface of the base component 101) so as to increase the load capacity through which the mount base 100 is capable of maintaining the structural integrity. For example, in various embodiments, the base component 101 may be configured such that the support beam 104 may be positioned about a central axis of the base component 101 extending along the base component width and/or the base component length. In various embodiments, the mount base 100 may comprise a plurality of support beams arranged about the base component 101 so as to disperse an engine force received by the base component 101.

In various embodiments, the mount base 100 may comprise one or more lateral positioning elements protruding from the base component 101 and configured to at least partially restrict the range of relative motion of a mounted engine (e.g., an exemplary engine arranged in a mounted position) with respect to the mount base 100 in a lateral direction (e.g., in the y-direction, along the width of the base component 101). In various embodiments, a lateral positioning element may comprise a substantially rigid element extending from the base component 101 in an at least partially vertically upward direction and may be configured to at least partially secure an exemplary mounted engine position relative to the mount base 100 in a lateral direction. For example, a lateral positioning element may comprise a length of a substantially rigid material that may either be integral with the base component 101 so as to define a singular piece of material or, alternatively or additionally, may be at least semi-permanently attached to the base component 101 (e.g., via a welding process and/or the like). As illustrated, in various embodiments, a mount base 100 may comprise a plurality of lateral positioning elements 140A, 140B collectively configured to define the full lateral range of motion (e.g., in both the positive and negative y-directions) of a mounted engine relative to the mount base 100. For example, the mount base 100 may be configured such that at least a portion of an engine arranged in a mounted position is disposed in between the two lateral positioning elements 140A, 140B. In such an exemplary circumstance, each of the lateral positioning elements 140A, 140B may act as a rigid barrier configured to prohibit the lateral displacement of the mounted engine disposed adjacent thereto relative to the mount base 100 in a respective lateral direction. As an illustrative example, a first lateral positioning element 140A may be configured to physically engage a side portion of an exemplary mounted engine so as to prevent the mounted engine from moving beyond the first lateral positioning element 140A in the negative y-direction. Further, as a second illustrative example, a second lateral positioning element 140B may be configured to physically engage a side portion of the exemplary mounted engine so as to prevent the mounted engine from moving beyond the second lateral positioning element 140B in the positive y-direction. As illustrated, a lateral positioning element 140A, 140B may define an angled configuration relative to the base component 101 such that the length of the lateral positioning element 140A, 140B extends along a side portion of the mounted engine in a direction that is at least partially defined by a z-component and one or both of an x-component and a y-component. As described herein, a lateral positioning element 140A, 140B may be configured so as to minimize the extent to which the lateral positioning element 140A, 140B may obstruct a user's line of sight to the mounted engine from a position proximate the engine mount.

In various embodiments, one or more a lateral positioning element 140A, 140B may comprise an apertures extending therethrough. In various embodiments, each lateral positioning device aperture 141A, 141B may be configured to receive at least a portion of an extension arm therethrough, which may be adjustably fastened relative to a respective lateral positioning element 140A, 140B. An extension arm may comprise a substantially rigid component that is adjustably removeable and defined by an arm length that, when fastened to a lateral positioning element 140A, 140B at a lateral positioning device aperture 141A, 141B, may extend from the lateral positioning element 140A, 140B to enable the lateral positioning element 140A, 140B to restrict the range of relative motion of a mounted engine in one or more non-lateral directions. As a non-limiting example, an extension arm may be configured to extend in a direction parallel to a central axis of the lateral positioning device aperture 141A, 141B through which it extends (e.g., perpendicular to the corresponding lateral positioning element surface) such that the engagement arm fastened to the lateral positioning element 140A, 140B may physically engage a mounted engine and prevent the displacement thereof relative to the mount base 100 in a longitudinal direction. In various embodiments, an extension arm may be configured to be selectively attached to a respective lateral positioning element 140A, 140B at a lateral positioning device aperture 141A, 141B extending therethrough via a pinned connection, a nut-and-bolt connection, or any other fastening means configured to prevent the extension arm from moving relative to the lateral positioning element 140A, 140B. In various embodiments, one or more lateral positioning element 140A, 140B may comprise an identifying tag, such as, for example, a name plate arranged so as to face in an outward direction from the engine mount such that a name, serial number, and/or other identifying mark may be readily visible to a user positioned proximate the engine mount.

As illustrated in FIGS. 3A and 3B, in an exemplary configuration wherein the mount base 100 comprises two lateral positioning elements 140A, 140B, the two lateral positioning elements 140A, 140B may be laterally separated by a distance therebetween. As described herein, the mount base 100 may be configured such that the lateral distance between the two lateral positioning elements 140A, 140B may be sufficiently large such that at least a portion of an exemplary engine may be disposed therebetween when the engine is mounted in a mounted position within the mount base 100. For example, the lateral distance between the two lateral positioning elements 140A, 140B may be at least as large as a width dimension (e.g., measured in a lateral direction) of the portion of an exemplary engine that is disposed therebetween when the engine is mounted in a mounted position, as described above. The mounting base 100 may be configured such that the lateral distance between the two lateral positioning elements 140A, 140B may be at least substantially equal to the width of the widest portion of the mounted engine disposed therebetween. In such an exemplary configuration, an engine mounted in a mounted position may be effectively secured in one or more lateral directions relative to the base component 101 by the two lateral positioning elements 140A, 140B, which may be collectively configured about the base component 101 such that the lateral range of relative motion of the portion of the mounted engine disposed therebetween is effectively eliminated. As a non-limiting illustrative example, the lateral distance between the two lateral positioning elements 140A, 140B may be at least approximately between 1.5 inches and 24 inches (e.g., between 4 inches and 10 inches).

In various embodiments, the mount base 100 may further comprise one or more longitudinal positioning elements protruding from the base component 101 and configured to at least partially restrict the range of relative motion of a mounted engine (e.g., an exemplary engine arranged in a mounted position) with respect to the mount base 100 in a longitudinal direction (e.g., in the x-direction, along the length of the base component 101). In various embodiments, a longitudinal positioning element may comprise a substantially rigid element extending from the base component 101 in an at least partially vertically upward direction. In various embodiments, a longitudinal positioning element may be arranged about a top base surface 102 on an opposite end of the base component length from the one or more lateral positioning elements 140A, 140B. As described in further detail herein, a longitudinal positioning element may be configured to at least partially secure an exemplary mounted engine position relative to the mount base 100 in a longitudinal direction. For example, a longitudinal positioning element may comprise a length of a substantially rigid material that may either be integral with the base component 101 so as to define a singular piece of material or, alternatively or additionally, may be at least semi-permanently attached to the base component 101 (e.g., via a welding process and/or the like). In various embodiments, the longitudinal positioning element of the mount base 100 may comprise one or more longitudinal positioning elements disposed about a top base surface 102 of the base component 101. For example, as illustrated in FIGS. 2-3B, a mount base 100 may comprise a single longitudinal positioning element 130 configured to at least partially define the longitudinal range of motion (e.g., in the negative x-direction) of a mounted engine relative to the mount base 100. For example, the mount base 100 may be configured such that at least a portion of an engine arranged in a mounted position may be disposed at least substantially adjacent the longitudinal positioning element 130 so as to physically engage the longitudinal positioning element 130. In such an exemplary circumstance, the longitudinal positioning element 130 may act as a rigid barrier configured to prohibit the longitudinal displacement of the mounted engine relative to the mount base 100 in a longitudinal direction beyond the longitudinal positioning element 130. As an illustrative example, the longitudinal positioning element 130 may be configured to physically engage a side portion of an exemplary mounted engine so as to prevent the mounted engine from moving beyond the longitudinal positioning element 130 in the negative x-direction. In various embodiments, a longitudinal positioning element 130 may extend from the base component 101 in a direction perpendicular to the a top base surface 103, as illustrated in FIGS. 2-3B, or, alternatively, may define an angled configuration relative to the base component 101 such that the length of the longitudinal positioning element 130 extends in a direction that is at least partially defined by a z-component and one or both of an x-component and a y-component. As described herein, a longitudinal positioning element 130 may be configured so as to minimize the extent to which the longitudinal positioning element 130 may obstruct a user's line of sight to the mounted engine from a position proximate the engine mount.

In various embodiments, the one or more longitudinal positioning element 130 may comprise a plurality of longitudinal positioning elements 130. For example, a plurality of longitudinal positioning elements 130 may be arranged about a top base surface 102 of the base component and may be collectively configured to define the full longitudinal range of motion (e.g., in both the positive and negative x-directions) of a mounted engine relative to the mount base 100. For example, the mount base 100 may be configured such that at least a portion of an engine arranged in a mounted position is disposed in between two of the plurality of the longitudinal positioning elements 130. In such an exemplary circumstance, each of the longitudinal positioning elements 130 may act as a rigid barrier configured to prohibit the longitudinal displacement of the mounted engine disposed adjacent thereto relative to the mount base 100 in a respective longitudinal direction. As an illustrative example, a first longitudinal positioning element 130 may be configured to physically engage a side portion of an exemplary mounted engine so as to prevent the mounted engine from moving beyond the first longitudinal positioning element 130 in the negative x-direction. Further, as a second illustrative example, a second longitudinal positioning element may be configured to physically engage a side portion of the exemplary mounted engine so as to prevent the mounted engine from moving beyond the second longitudinal positioning element longitudinal in the positive x-direction. As a non-limiting illustrative example, an exemplary longitudinal positioning element 130 may be configured so as to define a longitudinal positioning element height of at least approximately between 5 inches and 15 inches (e.g., between 7.5 inches and 10.5 inches), as measured from the top base surface 102 in the z-direction. In various embodiments, one or more longitudinal positioning element may comprise an identifying tag, such as, for example, a name plate arranged so as to face in an outward direction from the engine mount such that a name, serial number, and/or other identifying mark may be readily visible to a user positioned proximate the engine mount.

In various embodiments, one or more longitudinal positioning element 130 may comprise an aperture extending therethrough. In various embodiments, each longitudinal positioning device aperture 131 may be configured to receive at least a portion of an extension arm therethrough, which may be adjustably fastened relative to a longitudinal positioning element 130. As described above with respect to an exemplary lateral positioning element, an extension arm may comprise a substantially rigid component that is adjustably removeable and defined by an arm length that, when fastened to a longitudinal positioning element 130 at a longitudinal positioning device aperture 131, may extend from the longitudinal positioning element 130 to enable the longitudinal positioning element 130 to restrict the range of relative motion of a mounted engine in one or more non-longitudinal directions. As a non-limiting example, an extension arm may be configured to extend in a direction parallel to a central axis of the longitudinal positioning device aperture 131 through which it extends (e.g., perpendicular to the corresponding longitudinal positioning element surface) such that the engagement arm fastened to the longitudinal positioning element 130 may physically engage a mounted engine and prevent the displacement thereof relative to the mount base 100 in a lateral direction. In various embodiments, an extension arm may be configured to be selectively attached to a longitudinal positioning element 130 at a longitudinal positioning element aperture extending therethrough 131 via a pinned connection, a nut-and-bolt connection, or any other fastening means configured to prevent the extension arm from moving relative to the longitudinal positioning element 130.

Figure 4A:
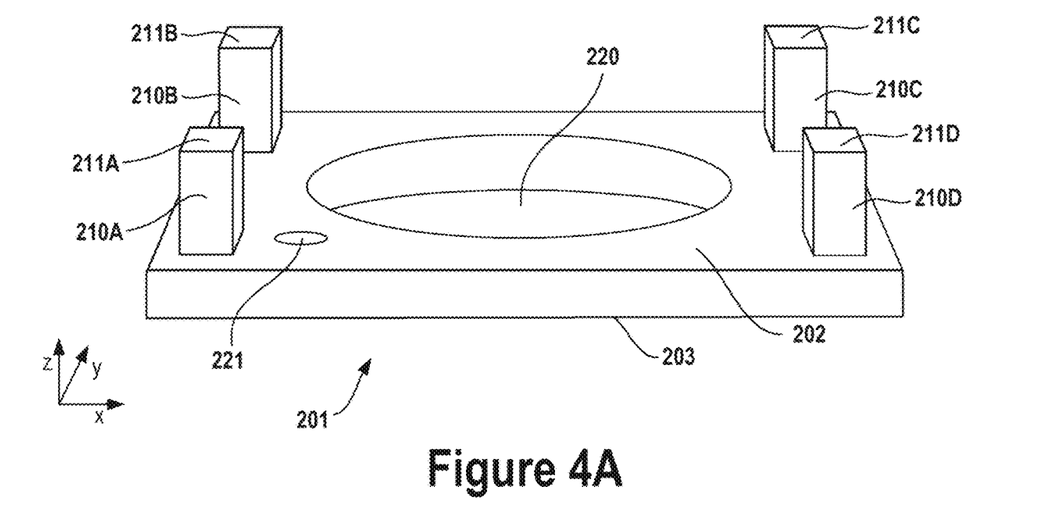
FIGS. 4A and 4B illustrate various views of an exemplary apparatus according to an embodiment described herein.
Figure 4B:
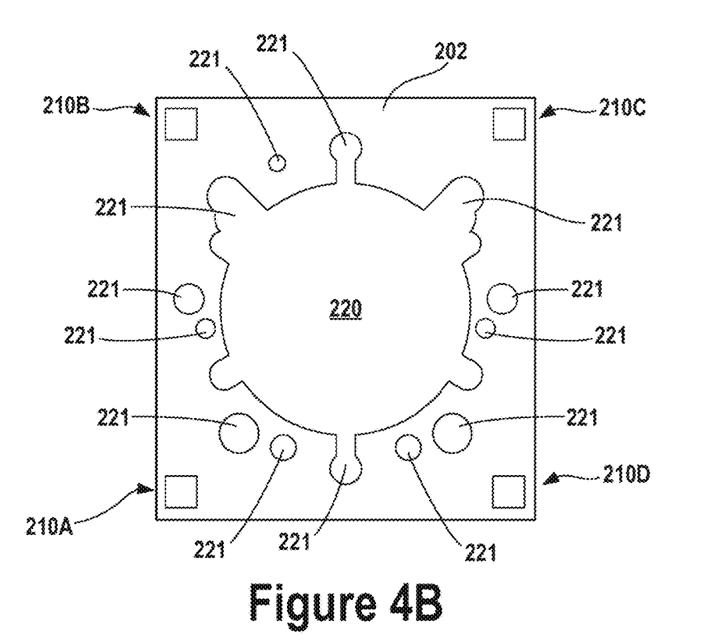

FIGS. 4A-4B illustrate various views of an exemplary apparatus according to an embodiment described herein. In particular, FIG. 4A and FIG. 4B illustrate a perspective view and a top view, respectively, of an exemplary attachment hub 200 according to various embodiments described herein. As described herein, an attachment hub 200 may be secured to a portion of an exemplary mount base 100 of the engine mount and may be configured to receive at least a portion of one or more engine tools so as to tether, holster, and/or organize the one or more engine tools in a position proximate the mount base 100 (e.g., an engine arranged in a mounted position). For example, an attachment hub 200 may be configured to receive an engine tool so as to position the engine tool proximate the mount base 100 to facilitate a connection to the engine and/or the accessibility of the one or more tools to a user standing near the engine mount. In various embodiments, an attachment hub 200 may comprise an attachment plate 201 configured to engage (e.g., physically support) a bottom portion of an engine arranged in a mounted position within the mount base 100. An exemplary attachment plate 201 may be defined at least in part by a top plate surface 202 and a bottom plate surface 203, with an attachment plate thickness extending therebetween in a vertical direction (e.g., in the z-direction, as illustrated). As illustrated in FIG. 4A, the attachment plate 201 may comprise a substantially flat planar configuration wherein both of the top plate surface 202 and the bottom plate surface 203 are substantially flat along a horizontal plane (e.g., in the x-direction). Alternatively, in various embodiments, one or both of the top plate surface 202 and the bottom plate surface 203 may comprise a curved configuration and/or a complex configuration so as to correspond to the geometric configuration of one or more of an exemplary engine, a mount base 100, and/or an engine tool. In various embodiments, an exemplary attachment plate 201 may be made of a substantially rigid material such as, for example, a metal, plastic, wood, rubber, and/or the like. As a non-limiting example, the attachment plate 201 may be made of aluminum so as to provide a lightweight mount configuration. In various embodiments, the attachment plate 201 may comprise a substantially rectangular profile having a plate length and a plate width, as illustrated, or, alternatively, the attachment plate 201 may comprise a substantially rounded profile defined by a plate diameter.

In various embodiments, the attachment hub 200 may comprise one or more apertures extending through the thickness of the attachment plate 201. In various embodiments, the one or more apertures of the attachment hub 200 may comprise one or more wide-mouth apertures 220 configured to receive at least a portion of one or more large engine tools (e.g., and or the electrical wiring attached thereto) within an outer perimeter of the aperture 220 so as to respectively tether, holster, and/or organize the at least one portion of the one or more large engine tools, such as, for example, a dyno attachment tool. extending therethrough in a position proximate the mount base 100. In various embodiments, each wide-mouth aperture 220 may be defined by a substantially large outer diameter such that the wide-mouth aperture 220 may be configured to receive at least one large and/or small engine tools (e.g., a plurality of large and/or small engine tools). For example, the exemplary wide-mouth apertures 220 illustrated in the exemplary attachment hub 200 embodiments depicted in FIGS. 4A and 4B are each arranged in a substantially central location about a respective attachment plate 201. Alternatively or additionally, in various embodiments, the one or more apertures of the attachment hub 200 may comprise one or more narrow-mouth apertures 221 configured to receive at least a portion of one or more small engine tools (e.g., and or the electrical wiring attached thereto) such as, for example, a hand-held powered maintenance tool, within an outer perimeter of the aperture 221 so as to respectively tether, holster, and/or organize the at least one portion of the one or more small engine tools extending therethrough in a position proximate the mount base 100. In various embodiments, each narrow-mouth aperture 221 may be defined by a substantially small outer diameter such that the narrow-mouth aperture 221 may be configured to receive a single small engine tool. Accordingly, a narrow-mouth aperture 221 may be configured such that the shape and/or size of the aperture 221 may be based on the corresponding configuration of the particular small engine tool that the narrow-mouth aperture 221 is configured to receive. For example, the exemplary narrow-mouth apertures 221 illustrated in the exemplary attachment hub 200 embodiments depicted in FIGS. 4A and 4B are each arranged about an outer portion (e.g., near an outer perimeter) of the attachment plate 201. In various embodiments, an exemplary attachment hub 200 may further comprise one or more fastening features, such as, for example, a hook, ridge, notch, slot and/or the like, disposed about an accessible surface of the attachment plate 201 such that a corresponding fastening feature secured to an external engine tool and/or automotive maintenance apparatus may be selectively attached to the attachment hub 200 via a pinned connection, a nut-and-bolt connection, or any other fastening means configured to facilitate an at least temporary fastening of the external apparatus to the engine mount described herein.

In various embodiments, the attachment hub 200 may comprise at least one attachment hub legs protruding from the attachment plate 201 and configured to physically engage a portion of an exemplary mount base 100 so as to secure the attachment hub 200 to the mount base 100. In various embodiments wherein the engine mount is configured such that the attachment hub 200 is secured to the bottom base surface 103 of the mount base 100, an attachment hub leg 210 may comprise a substantially rigid element extending from the top plate surface 202 of the attachment plate 201 in an at least partially vertically upward direction. In various embodiments the at least one attachment hub leg 210 may either be integral with the base component 101 so as to define a singular piece of material or, alternatively or additionally, may be at least semi-permanently attached to the base component 101 (e.g., via a welding process and/or the like).

In various embodiments, the at least one attachment hub leg may be defined at least in part by a leg length that may extend linearly between a first end of the attachment hub leg adjacent the attachment plate 200 and a second end of the attachment hub leg secured to the mount base 100. In such an exemplary circumstance, the leg length of the attachment leg may define the distance between the attachment plate 201 of the attachment hub 200 and the base component 101 of the mount base 100. For example, said distance between the attachment plate 201 of the attachment hub 200 and the base component 101 of the mount base 100 may facilitate the tethering, holstering, and/or organizing of the various engine tools engaged with the attachment hub 200 at a location that is a distance away from an exemplary engine mounted in a mounted position within the mount base 100. Such a spatial separation between the various engine tools attached to the engine mount and the mounted engine within the mount base 100 may minimize the extent to which said engine tools may obstruct a user's line of sight to the mounted engine and/or reduce the maneuverability of the engine mount in operation.

As illustrated in FIGS. 4A and 4B, an attachment hub 200 may comprise a plurality of attachment hub legs 210 extending from a surface of the attachment plate 201. The plurality of attachment hub legs may include four attachment hub legs 210A, 210B, 210C, 210D distributed at least substantially evenly about an outer perimeter of the top plate surface 202 of the attachment plate 201. As described herein, each attachment hub leg 210 may be configured to at least partially secure the attachment hub 200 to the mount base (e.g., at a bottom base surface 103). For example, each of the at least one attachment hub legs 210 may comprise an attachment leg base interface 211 at a second end thereof, wherein the second end is defined by the end of the attachment hub leg opposite from that which is secured to the attachment plate 201 of the attachment hub 200. In the illustrated embodiment, each of the plurality of attachment hub legs 210A, 210B, 210C, 210D comprises a respective attachment leg base interface 211A, 211B, 211C, 211D at the second end thereof so as to facilitate the securing of the attachment hub 200 to the mount base 100 and define the spatial configuration existing therebetween.

Figure 5:
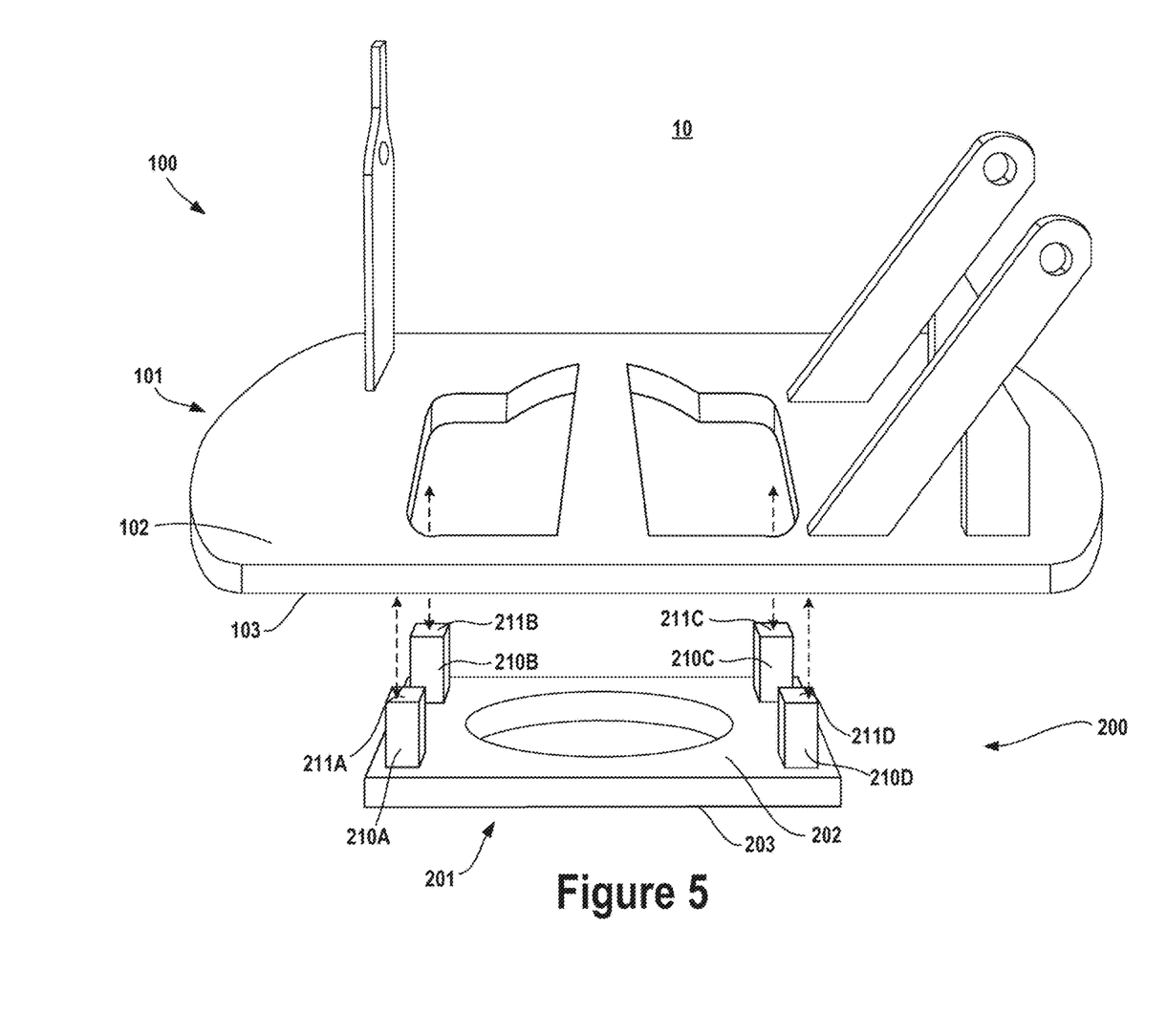
FIG. 5 illustrates an exploded view of an exemplary apparatus according to an embodiment described herein.
Figure 6:
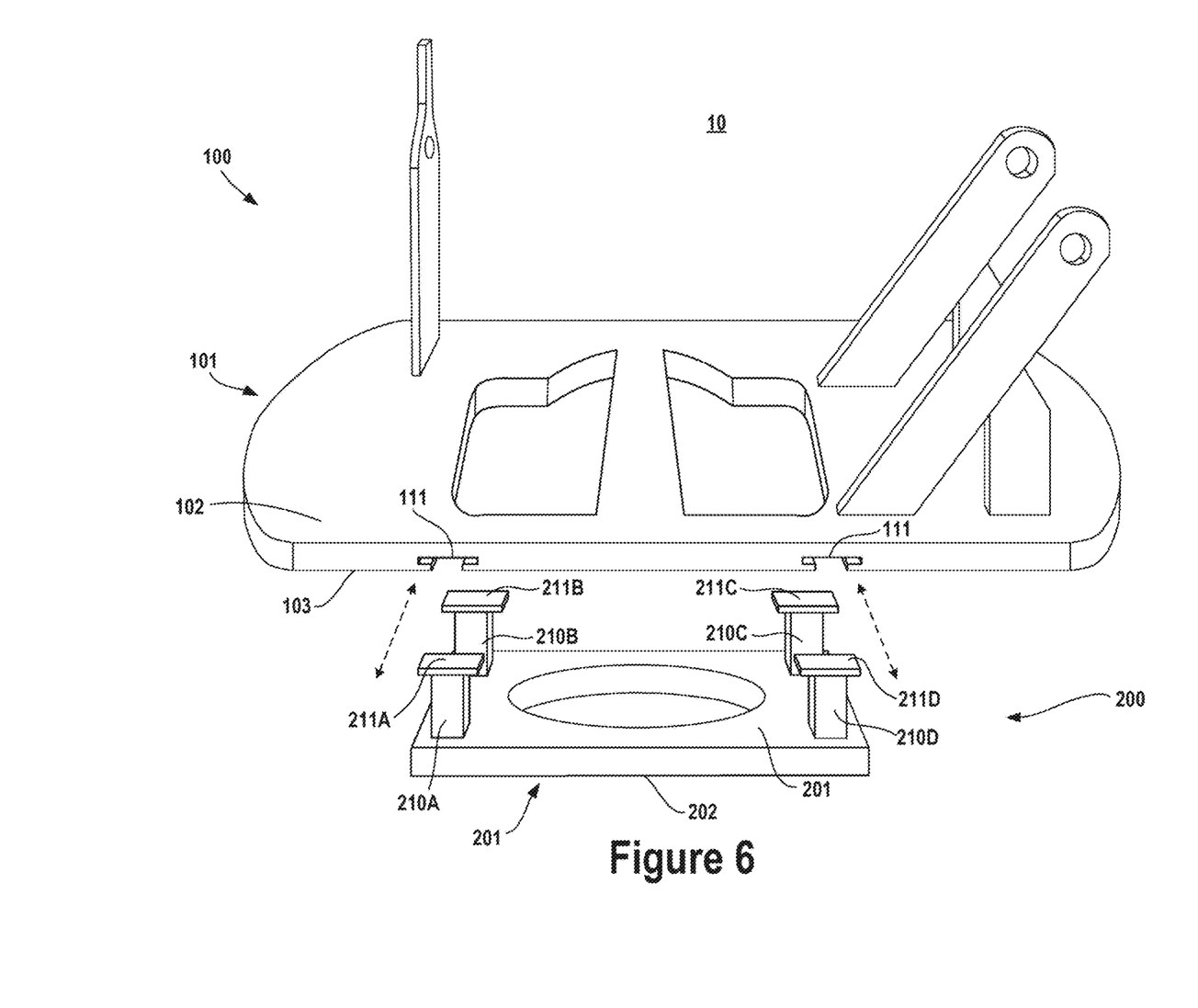
FIG. 6 illustrates an exploded view of an exemplary apparatus according to an embodiment described herein

FIGS. 5 and 6 illustrate various views of an exemplary apparatus according to an embodiment described herein. In particular, FIGS. 5 and 6 illustrate respective perspective views of an exemplary engine mounts according to various embodiments described herein. As described herein, an attachment hub 200 of an exemplary engine mount 10 may be fixed to a portion of an exemplary mount base 100, such as, for example, at a bottom base surface 103 of the base component 101. In various embodiments, the attachment hub 200 may be integral with the mount base 100 so as to define a singular piece of material. Alternatively, or additionally, may be at least semi-permanently attached to the base component 101 through one or more manufacturing processes such as, for example, a welding process, mechanical assembly, and/or the like. For example, as illustrated in FIG. 5, in various embodiments, the attachment hub 200 may arranged relative to the mount base 100 such that each attachment hub leg 210A, 210B, 210C, 210D is fixed to the bottom base surface 103 at a respective attachment leg base interface 211A, 211B, 211C, 211D thereof.

As illustrated in FIG. 6, the engine mount 10 may configured such that the attachment hub 200 may be selectably secured and detached from the mount base 100. In various embodiments, the attachment leg base interface 211A, 211B, 211C, 211D of each attachment hub leg 210A, 210B, 210C, 210D may embody one or more fastening features, such as, for example, a hook, ridge, notch, slot, and/or the like, configured to engage at least one corresponding base fastening feature 111 of the mount base 100. For example, the exemplary engine mount 10 embodiment illustrated in FIG. 6 comprises a mount base 100 comprising a plurality of corresponding base fastening features 111 embodied as t-shaped channels extending from the bottom base surface 103 into the base thickness throughout at least a portion of the base component 101. Further, each attachment leg base interface 211A, 211B, 211C, 211D of the exemplary attachment hub 200 comprises a corresponding t-shaped geometric feature that is configured to fit within one of the base fastening features 111 of the mount base 100. Each of the base fastening features 111 of the illustrated mount base 100 is configured to receive at least one of the attachment leg base interfaces 211A, 211B, 211C, 211D such that the attachment hub 200 is at least temporarily fastened to the mount base 100. Such an exemplary configuration wherein the attachment hub 200 is configured to be selectably removeable from the mount base 100 may facilitate a convertible engine mount 10 configuration that may be assembled and/or partially disassembled in operation to allow for more effective and efficient engine display and user interaction functionalities, as well as streamlined manufacturing and apparatus cleaning procedures.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An engine mount comprising:
a mount base configured to physically engage at least a portion of an engine positioned adjacent thereto so as to secure the engine in a mounted position relative to the engine mount, wherein the mount base defines an x-direction, a y-direction that is orthogonal to the x-direction, and a z-direction that is orthogonal to the x-direction and to the y-direction, wherein the x-direction is a longitudinal direction, the y-direction is a lateral direction, and the z-direction is a vertical direction, the mount base comprising:
a base component;
one or more lateral engine positioning element(s) protruding from the base component and configured to restrict a range of motion of the engine in the lateral direction,
wherein at least one of the one or more lateral engine positioning element(s) has an inward facing surface that defines a plane, wherein the plane has an angled configuration such that the plane is at least partially defined by a component of the z-direction and a component of the x-direction, and wherein the range of motion of the engine in the lateral direction is defined in part by a displacement of the engine measured relative to the mount base in the lateral direction; and
at least one base orifice extending through a thickness of the base component, the at least one base orifice being configured to receive a protruding portion of the engine within an internal volume of the at least one base orifice; and
an attachment hub comprising one or more attachment feature(s) configured to receive at least a portion of an external engine tool and engage the external engine tool such that at least a portion of the external engine tool is arranged at least substantially adjacent the mount base.

2. The engine mount of claim 1, wherein the at least one base orifice comprises a plurality of base orifices extending through an entirety of the thickness of the base component, wherein the thickness of the base component extends in the z-direction.

3. The engine mount of claim 2, wherein at least two of the plurality of base orifices are arranged a distance apart such that a portion of the base component extends therebetween, wherein the portion of the base component between the at least two of the plurality of base orifices defines a support beam, the support beam being configured to physically engage a portion of the engine so as to support the engine disposed in the mounted position.

4. The engine mount of claim 1, wherein the attachment hub further comprises an attachment plate; wherein the one or more attachment feature(s) of the attachment hub comprise(s) one or more attachment hub aperture(s) extending through a thickness of the attachment plate and being configured to receive at least a portion of the external engine tool within an internal volume of the one or more attachment hub aperture(s), wherein the thickness of the attachment plate extends in the z-direction.

5. The engine mount of claim 4, wherein the one or more attachment hub aperture(s) comprise(s) a plurality of attachment hub apertures.

6. The engine mount of claim 5, wherein the plurality of attachment hub apertures comprises at least one narrow-mouth aperture and at least one wide-mouth aperture.

7. The engine mount of claim 1, wherein the attachment hub is fixedly secured to at least a portion of the base component.

8. The engine mount of claim 1, wherein the mount base comprises one or more base fastening feature(s), and wherein the attachment hub comprises one or more attachment leg base interface(s) configured to engage at least a portion of the one or more base fastening feature(s) so as to facilitate a non-permanent attachment of the attachment hub to the mount base, wherein the attachment hub is configured to be selectably detachable from the mount base.

9. The engine mount of claim 1, wherein the one or more lateral engine positioning element(s) further comprise(s) a second lateral engine positioning element configured to further restrict the range of motion of the engine in the lateral direction, the second lateral engine positioning element being configured to restrict the range of motion of the engine in a second lateral direction, wherein the second lateral direction is in a substantially opposite direction from the lateral direction.

10. The engine mount of claim 9, wherein the at least one of the one or more lateral engine positioning element(s) and the second lateral engine positioning element are separated by a lateral distance extending therebetween, and wherein the at least one of the one or more lateral engine positioning element(s) and the second lateral engine positioning element are collectively configured to fully restrict the range of motion of the engine in the lateral direction such that the range of motion of the engine in the lateral direction is defined in part by the lateral distance between the at least one of the one or more lateral engine positioning element(s) and the second lateral engine positioning element.

11. The engine mount of claim 1, wherein the mount base further comprises a longitudinal engine positioning element configured to restrict a longitudinal range of motion of the engine in the longitudinal direction.

12. The engine mount of claim 1, wherein the inward facing surface that defines the plane extends directly from the base component.

13. An engine mount comprising:
  a mount base configured to physically engage at least a portion of an engine positioned adjacent thereto so as to secure the engine in a mounted position relative to the engine mount, wherein the mount base defines an x-direction, a y-direction that is orthogonal to the x-direction, and a z-direction that is orthogonal to the x-direction and to the y-direction, wherein the x-direction is a longitudinal direction, the y-direction is a lateral direction, and the z-direction is a vertical direction, the mount base comprising:
    a base component;
    one or more engine positioning element(s) protruding from the base component and configured to restrict a range of motion of the engine in at least one direction,
      wherein at least one of the one or more engine positioning element(s) has a surface that defines a plane, wherein the plane has an angled configuration such that the plane is at least partially defined by a component of the z-direction and one or both of a component of the x-direction and the y-direction, and wherein the range of motion of the engine in the at least one direction is defined in part by a displacement of the engine measured relative to the mount base in the at least one direction; and
    at least one base orifice extending through a thickness of the base component, the at least one base orifice being configured to receive a protruding portion of the engine within an internal volume of the at least one base orifice; and
  an attachment hub comprising one or more attachment feature(s) configured to receive at least a portion of an external engine tool and engage the external engine tool such that at least a portion of the external engine tool is arranged at least substantially adjacent the mount base,
  wherein the at least one of the one or more engine positioning element(s) that has the surface that defines the plane that has the angled configuration has comprises a positioning element aperture extending horizontally therethrough.

14. The engine mount of claim 13, wherein the at least one of the one or more engine positioning element(s) that has the surface that defines the plane that has the angled configuration comprises a first engine positioning element and a second engine positioning element, wherein the first engine positioning element comprises a first aperture and the second engine positioning element comprises a second aperture, wherein the first aperture and the second aperture are aligned to define a central axis that extends through both the first aperture and the second aperture, and wherein the central axis extends perpendicular to the plane.

15. The engine mount of claim 13, wherein the at least one of the one or more engine positioning element(s) that has the surface that defines the plane that has the angled configuration has a second surface that defines a second plane, wherein the surface is opposite of the second surface, and wherein the plane is parallel to the second plane.

16. An engine mount comprising:
  a mount base configured to physically engage at least a portion of an engine positioned adjacent thereto so as to secure the engine in a mounted position relative to the engine mount, wherein the mount base defines an x-direction, a y-direction that is orthogonal to the x-direction, and a z-direction that is orthogonal to the x-direction and to the y-direction, wherein the x-direction is a longitudinal direction, the y-direction is a lateral direction, and the z-direction is a vertical direction, the mount base comprising:
    a base component;
    one or more engine positioning element(s) protruding from the base component and configured to restrict a range of motion of the engine in at least one direction,
      wherein the range of motion of the engine in the at least one direction is defined in part by a displacement of the engine measured relative to the mount base in the at least one direction; and
    at least one base orifice extending through a thickness of the base component, the at least one base orifice being configured to receive a protruding portion of the engine within an internal volume of the at least one base orifice; and
  an attachment hub comprising one or more attachment feature(s) configured to receive at least a portion of an external engine tool and engage the external engine tool such that at least a portion of the external engine tool is arranged at least substantially adjacent the mount base, the attachment hub comprising:
    an attachment plate comprising at least two apertures extending through a thickness of the attachment plate, the thickness of the attachment plate extending in the z-direction.

17. The engine mount of claim 16, wherein the at least two apertures comprise a wide-mouth aperture and a narrow-mouth aperture, wherein the wide-mouth aperture is larger than the narrow-mouth aperture.

18. The engine mount of claim 17, wherein a diameter of the wide-mouth aperture is greater than a diameter of the narrow-mouth aperture.

19. The engine mount of claim 16, wherein the one or more engine positioning element(s) comprises a first engine positioning element and a second engine positioning element, wherein the first engine positioning element protrudes from the base component at an acute angle relative to the base component, wherein the first engine positioning element comprises a first aperture and the second engine positioning element comprises a second aperture, wherein the first aperture and the second aperture are aligned to define a central axis that extends through both the first aperture and the second aperture.

20. The engine mount of claim 16, wherein the attachment hub comprises an attachment hub leg protruding from the attachment plate, the attachment hub leg configured to physically engage the portion of the mount base.

* * * * *